(No Model.)
E. P. HOWE.
RATCHET CLUTCH MECHANISM.
No. 344,528. Patented June 29, 1886.
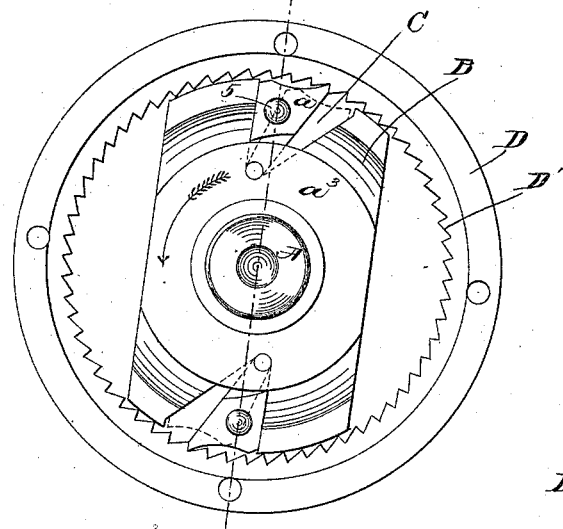
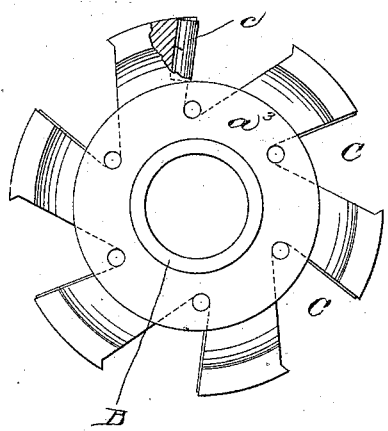
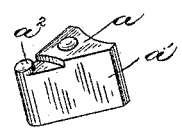
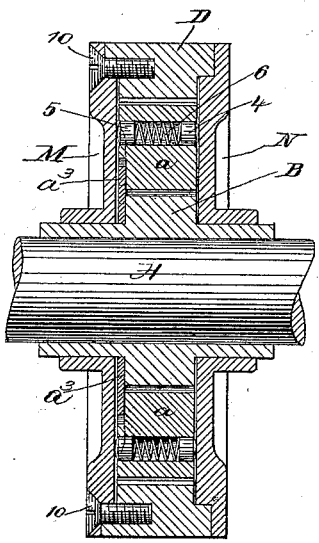
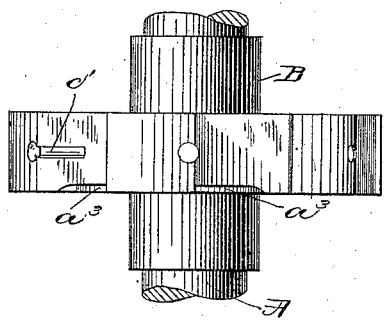
Witnesses
Fred L. Emery
John F. C. Prentith
Inventor
Edward P. Howe.
By Crosby Gregory
attys.

UNITED STATES PATENT OFFICE.

EDWARD P. HOWE, OF NORTHBOROUGH, ASSIGNOR OF ONE-HALF TO JOHN J. SHAW AND CHARLES R. ROGERS, OF PLYMOUTH, MASSACHUSETTS.

RATCHET-CLUTCH MECHANISM.

SPECIFICATION forming part of Letters Patent No. 344,528, dated June 29, 1886.

Application filed October 19, 1885. Serial No. 180,277. (No model.)

*To all whom it may concern:*

Be it known that I, EDWARD P. HOWE, of Northborough, county of Worcester, and State of Massachusetts, have invented an Improvement in Ratchet-Clutch Mechanism, of which the following description, in connection with the accompanying drawings, is a specification, like letters on the drawings representing like parts.

This invention has for its object to construct a ratchet-clutch mechanism which is simple and cheap, as well as positive and durable.

The invention consists, essentially, of a notched hub fast upon the main rotating shaft, suitable pawls pivoted to move freely within the notched portions of the hub, and friction devices whereby the pawls are caused to move noiselessly as the said shaft is rotated, combined with a ratchet-toothed ring inclosing the notched hub, and side pieces or plates secured to the said ratchet-toothed ring and through which the main shaft passes, said side plates thereby serving as bearings for the ratchet-toothed ring upon the rotating shaft. The pawls are preferably so made as to be readily removed from the notched hub when desired, and the friction devices are herein shown as consisting of two spring-controlled studs projecting slightly beyond the sides of the pawl and bearing against the interior of the side plates.

Figure 1 shows in side view a ratchet-clutch mechanism embodying this invention, one of the side plates being removed to show the operating parts within; Fig. 2, a transverse section taken on the dotted line $xx$; Fig. 3, a side view of a modified form of hub, to be referred to; Fig. 4, a top view thereof with part of the shaft carrying it, and Fig. 5 a perspective detail of one of the pawls removed.

The main rotating shaft A has fast upon it a hub, B, provided with V-shaped notches C, extending tangential toward the center of the hub. The notched hub B is inclosed in a ring, D, having ratchet-teeth D' cut around its interior. The notches C receive V-shaped pawls $a$, (shown separately in Fig. 5,) the broad ends of the said pawls being smaller than the notches, thereby permitting them to move freely in said notches. The said pawl $a$ also has a tooth, $a'$, which engages with the ratchet-teeth D'. The pawls, one for each notch, also have lugs $a^2$ located at the apex thereof, which pass through holes bored through a collar, $a^3$, fixed to the hub, thereby pivoting the pawls, allowing them to move back and forth, striking the opposite sides of the notches, and engaging and disengaging the ratchet-teeth as the shaft is rotated in either direction.

As the hub, fast to the shaft, is rotated in the direction of the arrow, Fig. 1, carrying the pawls, the latter would rattle and click over the ratchet-teeth, which is undesirable, and to obviate this friction devices are employed, which are herein shown as consisting of two studs, 4 5, normally projecting slightly beyond the sides of the pawls $a$ by a spiral spring, 6, said studs, as the pawls are moved either on their pivots or by the hub, bearing against the side plates, M N, secured to the opposite sides of the ratchet-toothed spring D by screws or other suitable fastenings 10; also, to prevent the pawls $a$ from making a noise by striking the sides of the notches cushions, herein shown as pieces of cork $c$ or other suitable material, are interposed and held in place in recesses C'. (See Fig. 4.)

As the main shaft A is rotated in the direction of the arrow, Fig. 1, its hub, fast thereon, will rotate correspondingly, carrying the pawls independently of the ratchet-toothed ring D; but should said shaft be reversed, or, if the ring were rotating should the ring be reversed, the pawls will immediately engage the ratchet-teeth.

In the drawings, Fig. 1, I have shown a hub having two notches and two pawls; but if greater power is desired the modification shown in Fig. 3 may be employed, wherein the hub 1 as six notches; and six, or, if desired, a less number of pawls may be employed.

The power is preferably applied to the ring D, as is common in this class of clutch.

I am aware that a ratchet-driving mechanism has been devised wherein a rotating shaft carries a hub to which, by a pin, is pivoted engaging devices, which co-operate with a ratchet-toothed ring, and I do not herein broadly claim such construction.

I claim—

1. A ratchet-clutch mechanism consisting of a main rotating shaft, and hub fast thereon having V-shaped notches, and V-shaped pawls placed loosely within and arranged to move freely within the notches of the hub, and having a bearing directly in the deepest portion thereof, or the point where the sides of the notches converge, combined with a ring inclosing the hub, and having ratchet-teeth to be engaged by the pawls, substantially as described.

2. The main rotating shaft, and notched hub fast thereon, collar $a^3$, and pawls having lugs $a^2$, placed within the notches of the hub and held in position by the collar $a^3$ by engagement with the lugs $a^2$, combined with the ratchet-toothed ring inclosing the said hub, and pawls, all substantially as described.

3. The main rotating shaft, and hub fast thereon having V-shaped notches extending tangential to its center, and V-shaped pawls placed in said notches, and of such size as to move freely therein, and bearing upon one or the other side of the notch, combined with a ratchet-toothed ring inclosing both said hub and pawls, substantially as described.

4. The combination, substantially as hereinbefore set forth, of the main rotating shaft, a notched hub fast thereon, the pawls $a$, arranged to move freely in the notches of the hub, and friction devices consisting of spring-controlled studs fitted into the sides of the pawls and normally projecting slightly therefrom, the ratchet-toothed ring inclosing the said hub and pawls, and the side plates, M M, against which the spring-controlled studs bear as the shaft rotates, thereby preventing the pawls from rattling.

5. The main rotating shaft, and notched hub fast thereon, pawls $a$, placed in the notches of the hub and retained in position by a collar, $a^3$, and cushions $c$, combined with a ratchet-toothed ring inclosing said hub and pawls, substantially as described.

In testimony whereof I have signed my name to this specification in the presence of two subscribing witnesses.

EDWARD P. HOWE.

Witnesses:
G. W. GREGORY,
C. M. CONE.